(12) United States Patent
Fattal

(10) Patent No.: US 11,310,478 B2
(45) Date of Patent: Apr. 19, 2022

(54) MULTIVIEW CAMERA ARRAY, MULTIVIEW SYSTEM, AND METHOD HAVING CAMERA SUB-ARRAYS WITH A SHARED CAMERA

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 50 days.

(21) Appl. No.: 16/830,109

(22) Filed: Mar. 25, 2020

(65) Prior Publication Data

US 2020/0228782 A1 Jul. 16, 2020

Related U.S. Application Data

(63) Continuation of application No. PCT/US2018/040819, filed on Jul. 3, 2018.
(Continued)

(51) Int. Cl.
*H04N 13/271* (2018.01)
*H04N 13/243* (2018.01)
(Continued)

(52) U.S. Cl.
CPC ......... *H04N 13/243* (2018.05); *H04N 13/282* (2018.05); *H04N 13/349* (2018.05); *H04N 13/398* (2018.05)

(58) Field of Classification Search
CPC .. H04N 13/243; H04N 13/349; H04N 13/282; H04N 13/398; H04N 5/232; H04N 5/247; H04N 5/2258
See application file for complete search history.

(56) References Cited

U.S. PATENT DOCUMENTS 6,522,325 B1 2/2003 Sorokin et al.
6,552,744 B2 4/2003 Chen
(Continued)

FOREIGN PATENT DOCUMENTS

JP H0435395 A 2/1992
JP 2006229725 A 8/2006
(Continued)

OTHER PUBLICATIONS

International Search Report and Written Opinion (ISRWO) of the International Searching Authority (ISA/KR) dated Nov. 12, 2018 (13 pages) for counterpart parent PCT patent application No. PCT/US2018/040819.
(Continued)

*Primary Examiner* — Howard D Brown, Jr.
(74) *Attorney, Agent, or Firm* — J. Michael Johnson

(57) ABSTRACT

A multiview camera array and multiview system employ camera sub-arrays having at least one camera in common to capture a multiview image of a scene for display on a multiview display. The multiview camera array includes a first sub-array of cameras and a second sub-array of cameras. Cameras of the first and second camera sub-arrays are spaced apart from one another by a first baseline distance and a second baseline distance, respectively. The multiview system further includes a multiview display configured to display the multiview image. A method of capturing a multiview image includes capturing a first plurality of different views of the scene with the first sub-array of cameras and capturing a second plurality of different views of the scene using the second sub-array of cameras.

17 Claims, 6 Drawing Sheets

Related U.S. Application Data

(60) Provisional application No. 62/567,138, filed on Oct. 2, 2017.

(51) Int. Cl.
*H04N 13/349* (2018.01)
*H04N 13/282* (2018.01)
*H04N 13/398* (2018.01)

(56) References Cited

U.S. PATENT DOCUMENTS

| | | | |
|---|---|---|---|
| 6,837,432 | B2 | 1/2005 | Tsikos et al. |
| 8,384,861 | B2 | 2/2013 | Jepsen |
| 8,503,813 | B2 | 8/2013 | Sun et al. |
| 8,675,068 | B2 | 3/2014 | Nixon |
| 8,754,941 | B1 | 6/2014 | Sarwari et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,466,109 | B1 | 10/2016 | Adsumilli et al. |
| 9,497,380 | B1 | 11/2016 | Jannard et al. |
| 9,557,466 | B2 | 1/2017 | Fattal |
| 9,785,119 | B2 | 10/2017 | Taff et al. |
| 10,345,505 | B2 | 7/2019 | Fattal |
| 10,484,662 | B2 | 11/2019 | Fattal |
| 2002/0145660 | A1 | 10/2002 | Kanade et al. |
| 2007/0014347 | A1 | 1/2007 | Prechtl et al. |
| 2008/0085047 | A1 | 4/2008 | Baker et al. |
| 2013/0329301 | A1 | 12/2013 | Travis |
| 2014/0267243 | A1 | 9/2014 | Venkataraman et al. |
| 2014/0267633 | A1 | 9/2014 | Venkataraman et al. |
| 2015/0085131 | A1 | 3/2015 | Anderson |
| 2015/0092023 | A1 | 4/2015 | Asakura |
| 2015/0279038 | A1 | 10/2015 | MacMillan et al. |
| 2015/0355403 | A1 | 12/2015 | Santori et al. |
| 2016/0018582 | A1 | 1/2016 | Fiorentino et al. |
| 2016/0248985 | A1 | 8/2016 | Mate et al. |
| 2017/0230631 | A1* | 8/2017 | Chang ............... G06T 1/0007 |
| 2017/0363794 | A1 | 12/2017 | Wan et al. |
| 2018/0278923 | A1 | 9/2018 | Fattal |
| 2018/0299608 | A1 | 10/2018 | Fattal et al. |
| 2018/0306965 | A1 | 10/2018 | Fattal |
| 2019/0018186 | A1 | 1/2019 | Fattal |
| 2019/0025494 | A1 | 1/2019 | Fattal et al. |
| 2019/0155105 | A1 | 5/2019 | Aieta et al. |
| 2020/0322590 | A1* | 10/2020 | Fattal ............... H04N 13/243 |

FOREIGN PATENT DOCUMENTS

| | | | |
|---|---|---|---|
| JP | 2010225092 A | 10/2010 | |
| JP | 2013083505 A | 5/2013 | |
| KR | 20140003741 A * | 1/2014 | ............ H04N 21/80 |
| KR | 20140003741 A | 1/2014 | |
| WO | 2012038856 A1 | 3/2012 | |
| WO | 2012144471 A | 10/2012 | |
| WO | 2017041073 A1 | 3/2017 | |
| WO | 2017131816 A1 | 8/2017 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Hill, Samuel L., Scalable Multi-view Stereo Camera Array for Real World Real-Time Image Capture and Three-Dimensional Displays, Thesis submitted to Program in Media Arts and Sciences, School of Architecture and Planning in partial fulfillment of requirements for the degree of Master of Science in Media Arts and Sciences at the Massachusetts Institute of Technology (MIT), Jun. 2004, 75 pages, copyright 2004 MIT.

Taguchi, Yuichi, et al., TransCAIP: A Live 3D TV System Using a Camera Array and an Integral Photography Display With Interactive Control of Viewing Parameters, IEEE Transactions on Visualuzation and Computer Graphics, Sep.-Oct. 2009, pp. 841-852, vol. 15, No. 5.

Zhang, Zhengyou, et al., Whiteboard Scanning and Image Enhancement, Microsoft Research Technical Report MSR-TR-2003-39, Jun. 2003, 25 pages, Microsoft Corporation, Redmond WA.

Jones, G., et al., Controlling Perceived Depth in Stereoscopic Images, Proceedings of SPIE, 2001, p. 42-53, vol. 4297.

* cited by examiner

MULTIVIEW CAMERA ARRAY, MULTIVIEW SYSTEM, AND METHOD HAVING CAMERA SUB-ARRAYS WITH A SHARED CAMERA

CROSS-REFERENCE TO RELATED APPLICATIONS

This application claims priority to International Patent Application No. PCT/US2018/040819, filed Jul. 3, 2018, which claims the benefit of U.S. Provisional Application No. 62/567,138 filed Oct. 2, 2017, the contents of both of which are hereby incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

Image capture and especially three-dimensional (3D) image capture typically involve substantial image processing of captured images to convert the captured images (e.g., typically two-dimensional images) into 3D images for display on a 3D display or a multiview display. The image processing may include, but is not limited to, depth estimation, image interpolation, image reconstruction, or other complicated processes that may produce significant time delay from the moment the images are captured to the moment those images are displayed.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
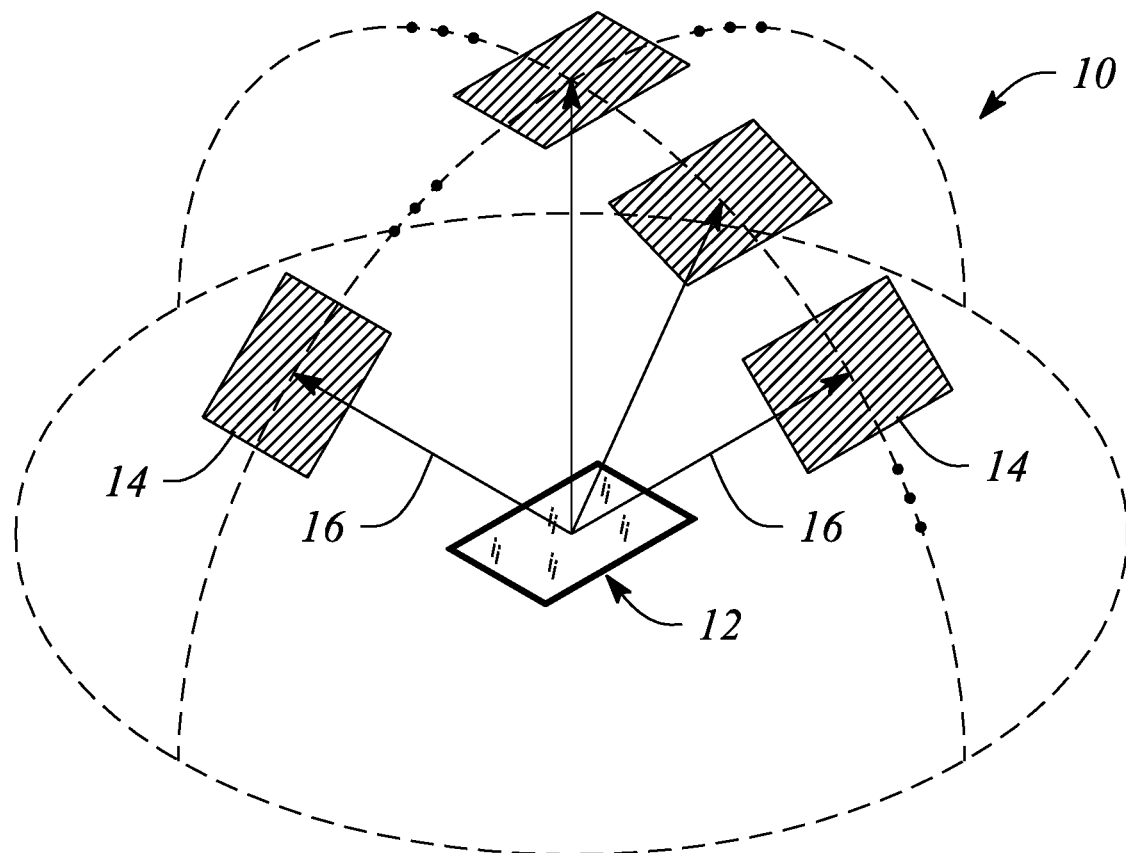
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide multiview or 'holographic' imaging that may correspond to or be used in conjunction with a multiview display. In particular, according to various embodiments of the principles described herein, multiview imaging of a scene may be provided by a multiview camera array comprising a plurality of camera sub-arrays, each camera sub-array having a different baseline spacing between cameras of the camera sub-array. Further, at least two camera sub-arrays have one or more cameras in common with one another. The multiview camera array is configured to produce a multiview image of the scene comprising a plurality of separate images captured or recorded from different angles or perspectives according to the different baseline spacings. Together the separate images embody a multiview image of the scene that may be viewed on the multiview display. Moreover, viewing the multiview image on the corresponding multiview display may enable a viewer to perceive elements within the multiview image of the scene at different apparent depths within the physical environment when viewed on the multiview display, for example. As such, the multiview camera array may produce a multiview image that, when viewed on the corresponding multiview display, provides a viewer with a three-dimensional (3D) viewing experience, according to some embodiments. Furthermore, sharing of cameras among the camera sub-arrays may reduce a cost and overall power consumption associated with capturing the multiview image relative to using camera sub-arrays that do not share cameras, according to various embodiments.

Herein a 'two-dimensional display' or '2D display' is defined as a display configured to provide a view of a displayed image that is substantially the same regardless of a direction from which the displayed image is viewed on the 2D display (i.e., within a predefined viewing angle or range of the 2D display). A liquid crystal display (LCD) found in may smart phones and computer monitors are examples of 2D displays. In contrast herein, a 'multiview display' is defined as a display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three-dimensional (3D) image. Uses of multiview displays and multiview systems applicable to the capture and display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10, according to an example consistent with the principles described herein. As illustrated, the multiview display 10 comprises a screen 12 that is viewed in order to see the multiview image. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows 16; and only four views 14 and view directions 16 are illustrated, all by way of example and not limitation. Note that while the different views 14 are illustrated in FIG. 1A as being above the screen, the views 14 actually appear on or in a vicinity of the screen 12 when a multiview image is displayed on the multiview display 10. Depicting the views 14 above the screen 12 is only for simplicity of illustration and is meant to represent viewing the multiview display 10 from a respective one of the view directions 16 corresponding to a particular view 14. Further, the views 14 and corresponding view directions 16 of the multiview display 10 are generally organized or arranged in a particular arrangement dictated by an implementation of the multiview display 10. For example, the views 14 and corresponding view directions 16 may have a rectangular arrangement, a square arrangement, circular arrangement, hexagonal arrangement, and so on, as dictated by a specific multiview display implementation, as further described below.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
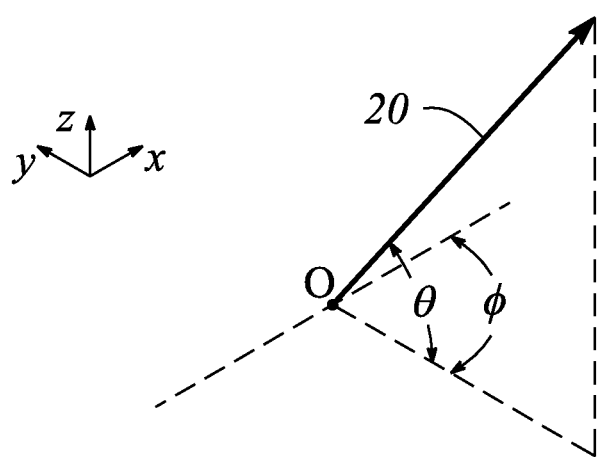
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction of a multiview display, according to an example of the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Herein, 'multiview' as used in the terms 'multiview image' and 'multiview display' is defined as a plurality of views representing different perspectives or including angular disparity between views of the plurality. Further, the term 'multiview' by definition explicitly includes more than two different views (i.e., a minimum of three views and generally more than three views). As such, 'multiview' as employed herein is explicitly distinguished from stereoscopic views that include only two different views to represent a scene, for example. Note however, while multiview images and multiview displays include more than two views, by definition herein, multiview images may be viewed (e.g., on a multiview display) as a stereoscopic pair of images by selecting only two of the views to view at a time (e.g., one view per eye).

A 'multiview pixel' is defined herein as a set or group of sub-pixels (such as light valves) representing 'view' pixels in each view of a plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of different views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds the light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Additionally, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a two-dimensional (2D) array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a diffractive multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, B, is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., $m=\pm 1, \pm 2, \ldots$). A diffraction angle $\theta_m$ of a light beam produced by the diffraction grating may be given by equation (1). First-order diffraction or more specifically a first-order diffraction angle is provided when the diffraction order m is equal to one (i.e., m=1).

Further, the diffractive features in a diffraction grating may be curved and may also have a predetermined orientation (e.g., a slant or a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the directional light may be a function of an angle of the diffractive feature at a point at which the light is incident on the diffraction grating relative to a propagation direction of the incident light.

By definition herein, a 'multibeam element' is a structure or element of a backlight or a display that produces light that includes a plurality of light beams. A 'diffractive' multibeam element is a multibeam element that produces the plurality of light beams by or using diffractive coupling, by definition. In particular, in some embodiments, the diffractive multibeam element may be optically coupled to a light guide of a backlight to provide the plurality of light beams by diffractively coupling out a portion of light guided in the light guide. Further, by definition herein, a diffractive multibeam element comprises a plurality of diffraction gratings within a boundary or extent of the multibeam element. The light beams of the plurality of light beams (or 'light beam plurality') produced by a multibeam element have different principal angular directions from one another, by definition herein. In particular, by definition, a light beam of the light beam plurality has a predetermined principal angular direction that is different from another light beam of the light beam plurality. According to various embodiments, the spacing or grating pitch of diffractive features in the diffraction gratings of the diffractive multibeam element may be sub-wavelength (i.e., less than a wavelength of the guided light).

While a multibeam element with a plurality of diffraction gratings may be used as an illustrative example in the discussion that follows, in some embodiments other components may be used in multibeam element, such as at least one of a micro-reflective element and a micro-refractive element. For example, the micro-reflective element may include a triangular-shaped mirror, a trapezoid-shaped mirror, a pyramid-shaped mirror, a rectangular-shaped mirror, a hemispherical-shaped mirror, a concave mirror and/or a convex mirror. In some embodiments, a micro-refractive element may include a triangular-shaped refractive element, a trapezoid-shaped refractive element, a pyramid-shaped refractive element, a rectangular-shaped refractive element, a hemispherical-shaped refractive element, a concave refractive element and/or a convex refractive element.

According to various embodiments, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams in the light beam plurality are determined by a characteristic including, but not limited to, a size (e.g., one or more of length, width, area, and etc.) of the diffractive multibeam element along with a 'grating pitch' or a diffractive feature spacing and an orientation of a diffraction grating within diffractive multibeam element. In some embodiments, the diffractive multibeam element may be considered an 'extended point light source', i.e., a plurality of point light sources distributed across an extent of the diffractive multibeam element, by definition herein. Further, a light beam produced by the diffractive multibeam element has a principal angular direction given by angular components {θ, φ}, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a collimating diffraction grating as well as various combinations thereof.

Herein, a 'collimation factor,' denoted a, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an apparatus or device that emits light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color (i.e., may include a particular wavelength of light) or may include a particular wavelength of light (e.g., white light). Moreover, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. The different colors may include primary colors (e.g., red, green, blue) for example. Further, the 'plurality of light sources of different colors' may include more than one light source of the same or substantially similar color as long as at least two light sources of the plurality of light sources are different color light sources (i.e., at least two light sources produce colors of light that are different). Hence, by definition herein, a 'plurality of light sources of different colors' may include a first light source that produces a first color of light and a second light source that produces a second color of light, where the second color differs from the first color.

Herein, an 'arrangement' or a 'pattern' is defined as relationship between elements defined by a relative location of the elements and a number of the elements. More specifically, as used herein, an 'arrangement' or a 'pattern' does not define a spacing between elements or a size of a side of an array of elements. As defined herein, a 'square' arrangement is a rectilinear arrangement of elements that includes an equal number of elements (e.g., cameras, views, etc.) in each of two substantially orthogonal directions (e.g., an x-direction and a y-direction). On the other hand, a 'rectangular' arrangement is defined as a rectilinear arrangement that includes a different number of elements in each of two orthogonal directions.

Herein, a spacing or separation between elements of an array is referred to as a 'baseline' or equivalently a 'baseline distance,' by definition. For example, cameras of an array of cameras may be separated from one another by a baseline distance which defines a space or distance between individual cameras of the camera array.

Further by definition herein, the term 'broad-angle' as in 'broad-angle emitted light' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (120°). Alternatively, the broad-angle emitted light may have an angular range that is greater than plus and minus forty-five degrees (e.g., >±45°) relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°). A 'broad-angle backlight' is a backlight configured to provide broad-angle emitted light, by definition herein.

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an image processor or other elements described below may all be implemented as circuit elements within an ASIC or a VLSI circuit. Implementations that employ an ASIC or a VLSI circuit are examples of hardware-based circuit implementations.

In another example, an embodiment of the image processor may be implemented as software using a computer programming language (e.g., C/C++) that is executed in an operating environment or a software-based modeling environment (e.g., MATLAB®, MathWorks, Inc., Natick, Mass.) that is executed by a computer (e.g., stored in memory and executed by a processor or a graphics processor of a computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions above, some embodiments described herein may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a camera' means one or more cameras and as such, 'the camera' means 'the camera(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
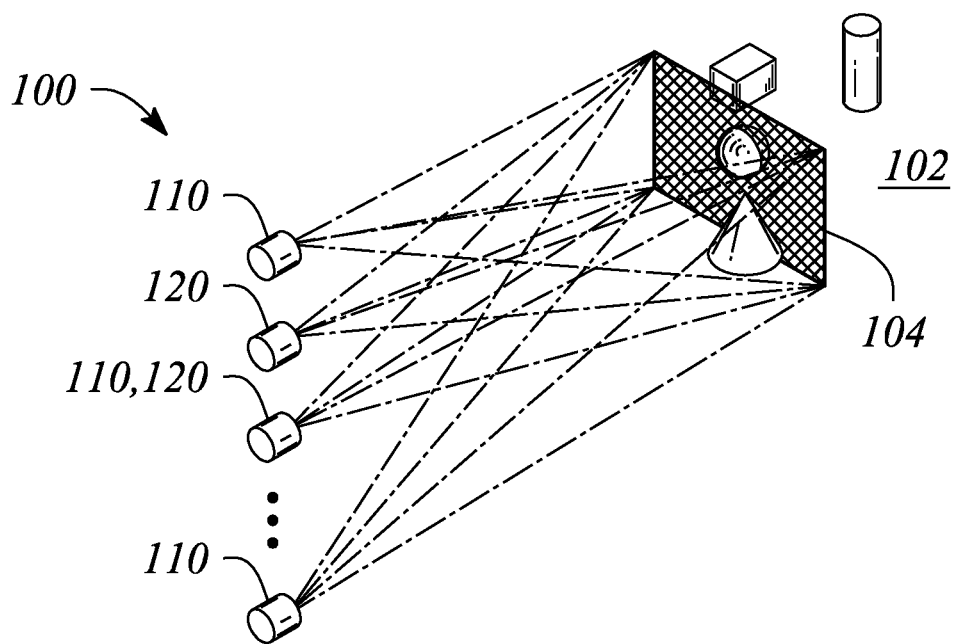
FIG. 2A illustrates a perspective view of a multiview camera array in an example, according to an embodiment consistent with the principles described herein.
Figure 2B:
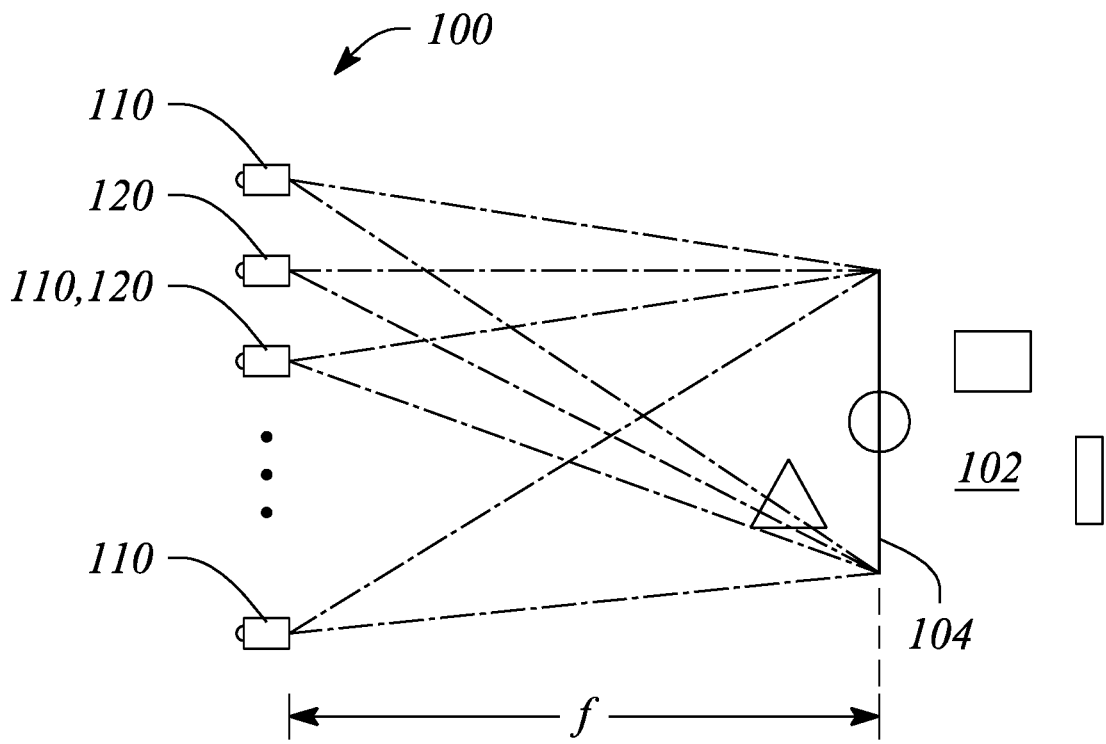
FIG. 2B illustrates a side view of the multiview camera array of FIG. 2A in an example, according to an embodiment consistent with the principles described herein.
Figure 2C:
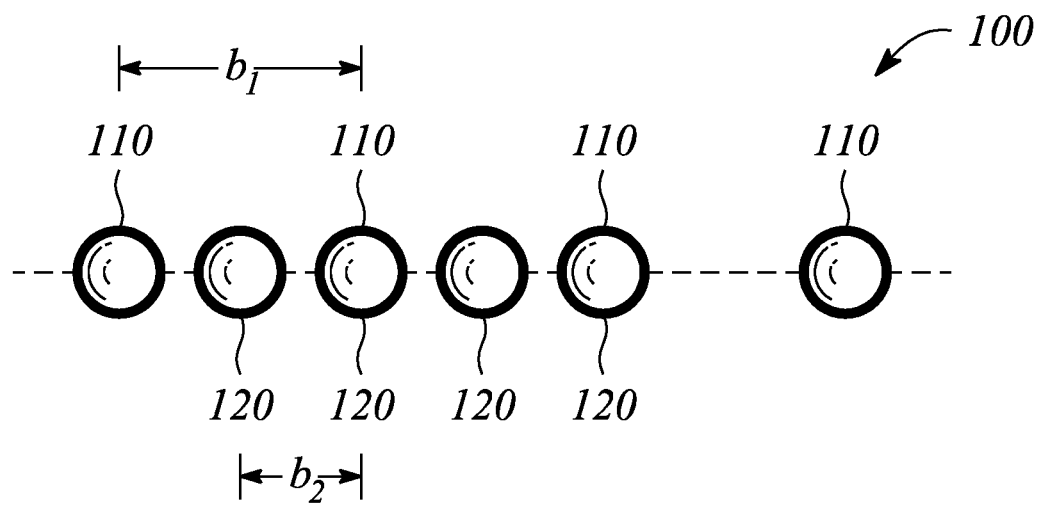
FIG. 2C illustrates a front view of a multiview camera array in another example, according to an embodiment consistent with the principles described herein.

According to some embodiments of the principles described herein, a multiview camera array is provided. FIG. 2A illustrates a perspective view of a multiview camera array 100 in an example, according to an embodiment consistent with the principles described herein. FIG. 2B illustrates a side view of the multiview camera array 100 of FIG. 2A in an example, according to an embodiment consistent with the principles described herein. FIG. 2C illustrates a front view of a multiview camera array 100 in another example, according to an embodiment consistent with the principles described herein. The multiview camera array 100 is configured to capture a multiview image of a scene 102. In particular, the multiview camera array 100 may be configured to capture a plurality of images 104 of the scene 102 representing different views of the multiview image of the scene 102. Further, the different views may be different perspective views of the scene 102, according to various embodiments. Also illustrated (e.g., in FIG. 2B) is a distance $f$ to the scene. The distance $f$ may be referred to as a 'focal plane' of the multiview camera array 100.

As illustrated, the multiview camera array 100 comprises a first sub-array of cameras 110 spaced apart from one another by a first baseline distance $b_1$. That is, cameras 110 of an adjacent pair of cameras 110 within the first sub-array of cameras 110 are separated from one another according to the first baseline $b_1$, as illustrated. In some embodiments, the first baseline distance $b_1$ between each pair of adjacent cameras 110 of the first camera sub-array is equal or substantially equal. The first baseline distance $b_1$ between cameras 110 of the first sub-array of cameras 110 is configured to provide the cameras 110 with different perspectives views of the scene 102. In turn, the different perspective views may represent the different views of a multiview image. As such, the cameras 110 of the first camera sub-array are configured to a plurality of images 104 of the scene 102, each image 104 representing a different view of a multiview image of the scene 102, according to various embodiments.

The multiview camera array 100 illustrated in FIGS. 2A-2C further comprises a second sub-array of cameras 120 spaced apart from one another by a second baseline distance $b_2$. As with the first camera sub-array, cameras 120 of an adjacent pair of cameras 120 within the second sub-array of cameras 120 are separated from one another according to the second baseline $b_2$, as illustrated. In some embodiments, the second baseline distance $b_2$ between each pair of adjacent cameras 120 of the second camera sub-array is equal or substantially equal. Further, as with the first sub-array of cameras, the second baseline distance $b_2$ between cameras 120 of the second camera sub-array is configured to provide the cameras 120 with different perspectives views of the scene 102. As such, the cameras 120 of the second sub-array of cameras are also configured to capture a plurality of images 104 of the scene 102, each image 104 representing a different view of a multiview image of the scene 102, according to various embodiments.

According to various embodiments, the multiview camera array 100 comprises more than two (i.e., three or more) cameras 110, 120. Further, each of the first and second sub-arrays of cameras 110, 120 comprises two or more cameras 110, 120. According to various embodiments, the first baseline distance $b_1$ is an integer multiple of the second baseline distance $b_2$ (i.e., $b_1 = n \cdot b_2$, where n is an integer). In addition, one or more cameras 110, 120 of the first and second camera sub-arrays are common to or a member of each of the sub-arrays. In particular, at least one camera 120 of the second sub-array of cameras 120 is a member of the first sub-array of cameras 110, as illustrated.

In some embodiments, a number of the cameras 110 in the first sub-array of cameras 110 is equal to a number of the cameras 120 in the second sub-array of cameras 120. In other embodiments, the first camera array and the second camera sub-array may have different numbers of cameras 110, 120, respectively. In some embodiments, a number of the different views of the multiview image may correspond to the number of cameras 110, 120 of one or both of the first camera sub-array and the second camera sub-array. In some embodiments, one or both of the first sub-array of cameras 110 and the second sub-array of cameras 120 is a linear array. That is, cameras 110, 120 of the sub-arrays are arranged along a common linear axis. In other embodiments, the array may be curvilinear (i.e., the cameras 110, 120 may be arranged along a curved axis). In some embodiments, cameras 120 of the second sub-array of cameras 120 may be interleaved with cameras 110 of the first sub-array of cameras 110. For example, the cameras 110, 120 may be interleaved along a common axis such as a common linear axis.

For example, FIG. 2C illustrates each of the first sub-array of cameras 110 and the second sub-array of cameras 120 comprising four (4) cameras 110, 120. Further, the cameras 110, 120 of the first and second camera sub-arrays are arranged along a common linear axis represented by a dashed line in FIG. 2C. Further still in FIG. 2C, cameras 120 of the second camera sub-array are interleaved with cameras 110 of the first camera sub-array along the common linear axis. Moreover, at least one camera 110, 120 is common between the first and the second camera sub-arrays, as illustrated in each of FIGS. 2A-2C. Sharing cameras 110, 120 between the first and second camera sub-arrays may reduce a total number of cameras 110, 120 in the multiview camera array 100, according to some embodiments.

In various embodiments, different combinations of cameras 110, 120 may be employed in different ways to capture the multiview image by the multiview camera array 100. For example, a selected one of the first sub-array of cameras 110 and the second sub-array of cameras 120 may be configured to provide the plurality of images 104 of the scene 102 representing the different views. In various embodiments, the selected one of the first and second sub-array of cameras 110, 120 may be determined based on which of a respective first and second baseline $b_1$, $b_2$ is best suited for producing a multiview image of a given scene 102 at an associated distance $f$ or focal plane.

In particular, in some embodiments, the multiview camera array 100 is configured to determine the selected one of the first and second camera sub-arrays based on a distance (e.g., the distance $f$) between an object in the scene 102 and the multiview camera array 100. The distance may be measure by an ultrasonic or laser-based distance sensor, for example. In other embodiments, an auto-focus of a camera 110, 120 of the multiview camera array 100 may be configured to automatically determine the selected one of the first and second camera sub-arrays based on a focal plane of the auto-focus. In yet another embodiment, the selected one of the first and second camera sub-arrays may be selected by a user (e.g., a user input). For example, a user of the multiview camera array 100 may manually select one of the first sub-array of cameras 110 and the second sub-array of cameras 120, e.g., by pressing a physical button or activating a virtual icon in a user interface, etc.

In some embodiments, only cameras 110, 120 of the selected sub-array of cameras 110, 120 are employed to capture the multiview image. For example, the first sub-array of cameras 110 may be selected and only the cameras 110 of the first camera sub-array are activated and used to capture the plurality of images 104 that make up the multiview image. In another example, the second sub-array of cameras 120 may be selected and used to capture the plurality of images 104. In other embodiments, cameras 110, 120 from each of the first and second camera sub-arrays may be activated and used to capture images. Selection of images captured by either the first camera sub-array or the second camera sub-array provided during a post-capture period may be used to determine which of the captured images are included in the plurality of images 104 of the multiview image, in these embodiments.

Note that the first and second baselines $b_1$, $b_2$ may be provide different amounts of disparity between the plurality of images 104. The different amounts of disparity may yield multiview images having desirable qualities based on different distances $f$ to the scene, for example. In particular, baselines $b_1$, $b_2$ may be used to provide three-dimensional (3D) image characteristics (image disparity) sufficient to make a given scene seem or appear to be more or less '3D' to a user. For example, a smaller baseline (such as the first baseline $b_1$ in FIG. 2C) may be used to image a scene having objects relatively close to the cameras 110, 120 (such as a group of vases or people close to the multiview camera array 100). Alternatively, a longer baseline (such as the second baseline $b_2$) may be used to image another scene with objects that are relatively farther away (such as mountains), even though all the cameras 110, 120 may be focused at infinity.

According to various embodiments, the cameras 110, 120 of the first and second camera sub-arrays may comprise substantially any camera or related imaging or image capture device. In particular, the cameras 110, 120 may be digital cameras configured to capture digital images. For example, a digital camera may include digital image sensor such as, but not limited to, a charge-coupled device (CCD) image sensor, a complimentary metal-oxide semiconductor (CMOS) image sensor, or a back-side-illuminated CMOS (BSI-CMOS) sensor. Further, the cameras 110, 120 may be configured to capture one or both of still images (e.g., photographs) and moving images (e.g., video), according to various embodiments. In some embodiments, the cameras 110, 120 capture amplitude or intensity and phase information in the plurality of images.

Figure 3:
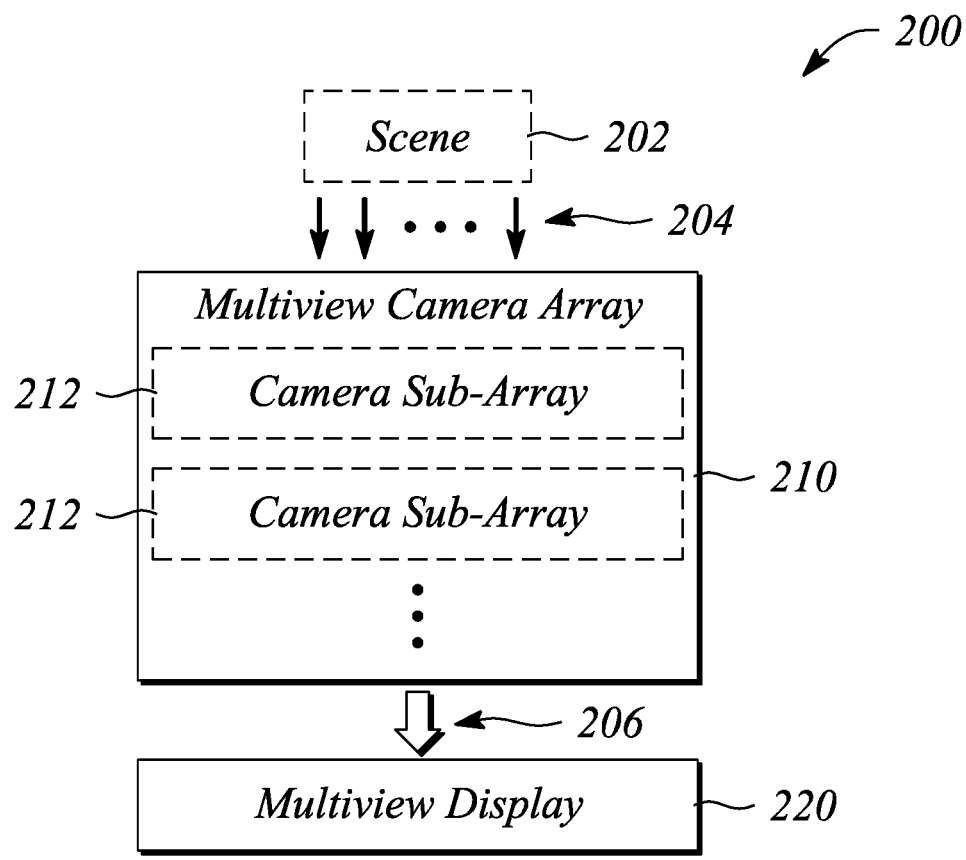
FIG. 3 illustrates a block diagram of a multiview system in an example, according to an embodiment consistent with the principles described herein.

According to other embodiments of the principles described herein, a multiview system is provided. FIG. 3 illustrates a block diagram of a multiview system 200 in an example, according to an embodiment consistent with the principles described herein. The multiview system 200 may be used to capture or image a scene 202 as a set or plurality of directional views 204 of the scene 202. Further, the multiview system 200 may be configured to display a multiview image 206 representing the captured plurality of directional views 204 of the scene 202, according to various embodiments.

As illustrated in FIG. 3, the multiview system 200 comprises a multiview camera array 210. The multiview camera array 210 comprises a plurality of camera sub-arrays 212 configured to capture the multiview image 206 of the scene 202. Cameras of the plurality of camera sub-arrays 212 are interleaved with one another. Further, at least two of the camera sub-arrays 212 have a camera in common, i.e., share a common camera. In some embodiments, the multiview camera array 210 may be substantially similar to the multiview camera array 100, described above. Further, the camera sub-arrays 212 may be substantially similar to the first and second sub-arrays of cameras 110, 120. In particular, baseline distances between adjacent cameras within different ones of the camera sub-arrays 212 are integer multiples of one another, according to various embodiments. In some embodiments, cameras of the plurality of camera sub-arrays 212 may be arranged along a common linear axis, the multiview camera array 210 being a linear array.

The multiview system 200 illustrated in FIG. 3 further comprises a multiview display 220 configured to display the multiview image 206. In some embodiments, a number of different directional views 204 of the multiview image 206 may correspond to a number of cameras in the camera sub-arrays 212 of the multiview camera array 210. For example, the camera sub-arrays 212 may each include four (4) cameras and the number of images corresponding to the number of different directional views 204 may be equal to four (4). In another example, the camera sub-arrays 212 may include six (6) or eight (8) cameras and there may be six (6) or eight (8) images in the multiview image 206 captured by the multiview camera array 210 and displayed by the multiview display 220.

In some embodiments, the different directional views 204 of multiview image 206 correspond to images captured by different cameras of a selected camera sub-array 212 of the plurality of camera sub-arrays 212. The selected camera sub-array 212 may be one or both of selected by a user and selected automatically according to a distance between an object in the scene 202 and the multiview camera array 210, for example. In some embodiments, the distance between the object and the multiview camera array 210 is determined by an auto-focus condition of a camera of the multiview camera array 210. In some embodiments, each camera sub-array 212 of the camera sub-array plurality has an equivalent number of cameras, while in other embodiments the number of cameras differs.

According to various embodiments, the multiview display 220 may be substantially any multiview display or display capable of displaying a multiview image. In some embodiments, the multiview display 220 may be a multiview display that employs directional scattering of light and subsequent modulation of the scattered light to provide or display the multiview image 206.

Figure 4A:
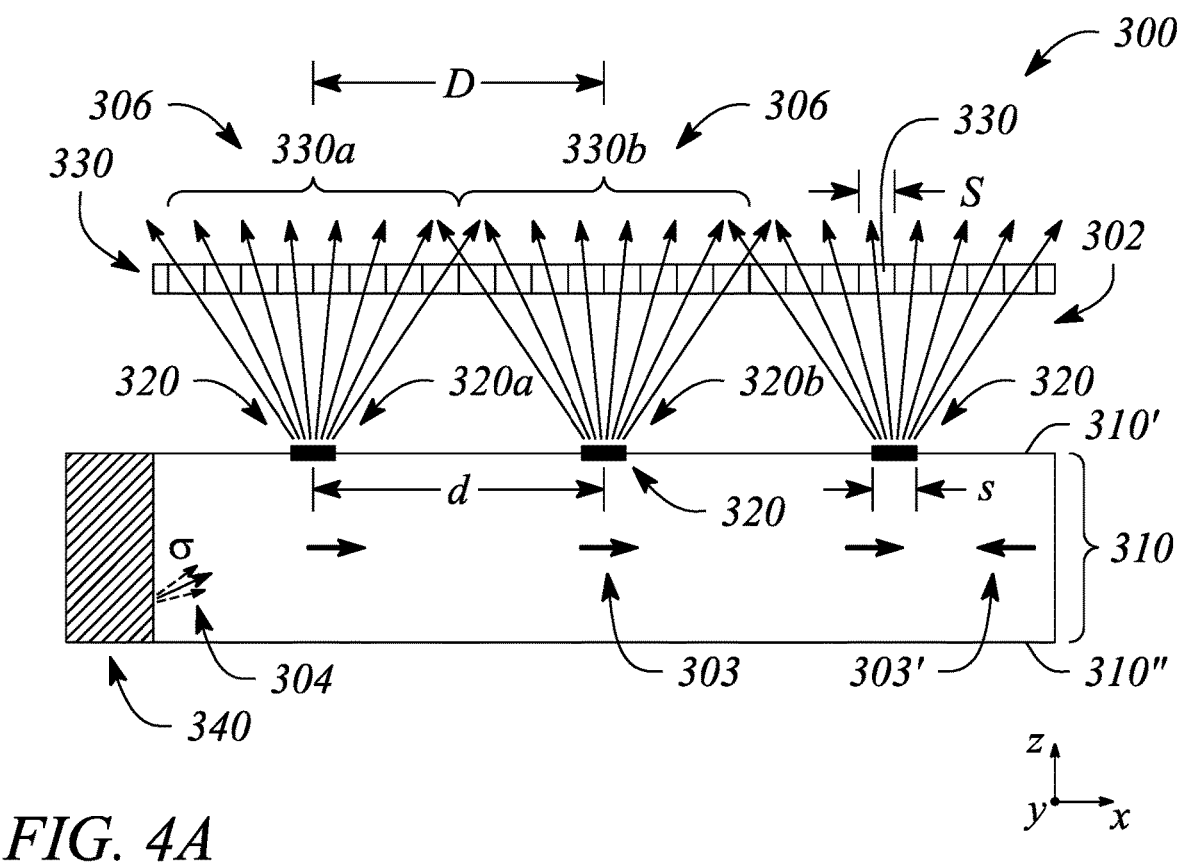
FIG. 4A illustrates a cross-sectional view of a multiview display in an example, according to an embodiment consistent with the principles described herein.
Figure 4B:
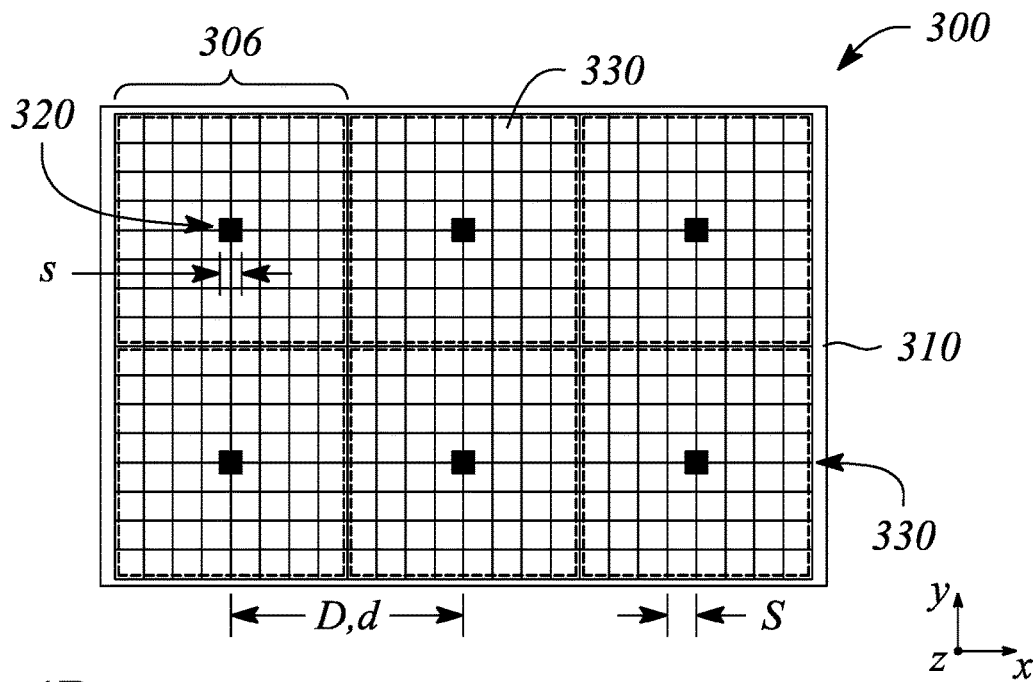
FIG. 4B illustrates a plan view of a multiview display in an example, according to an embodiment consistent with the principles described herein.
Figure 4C:
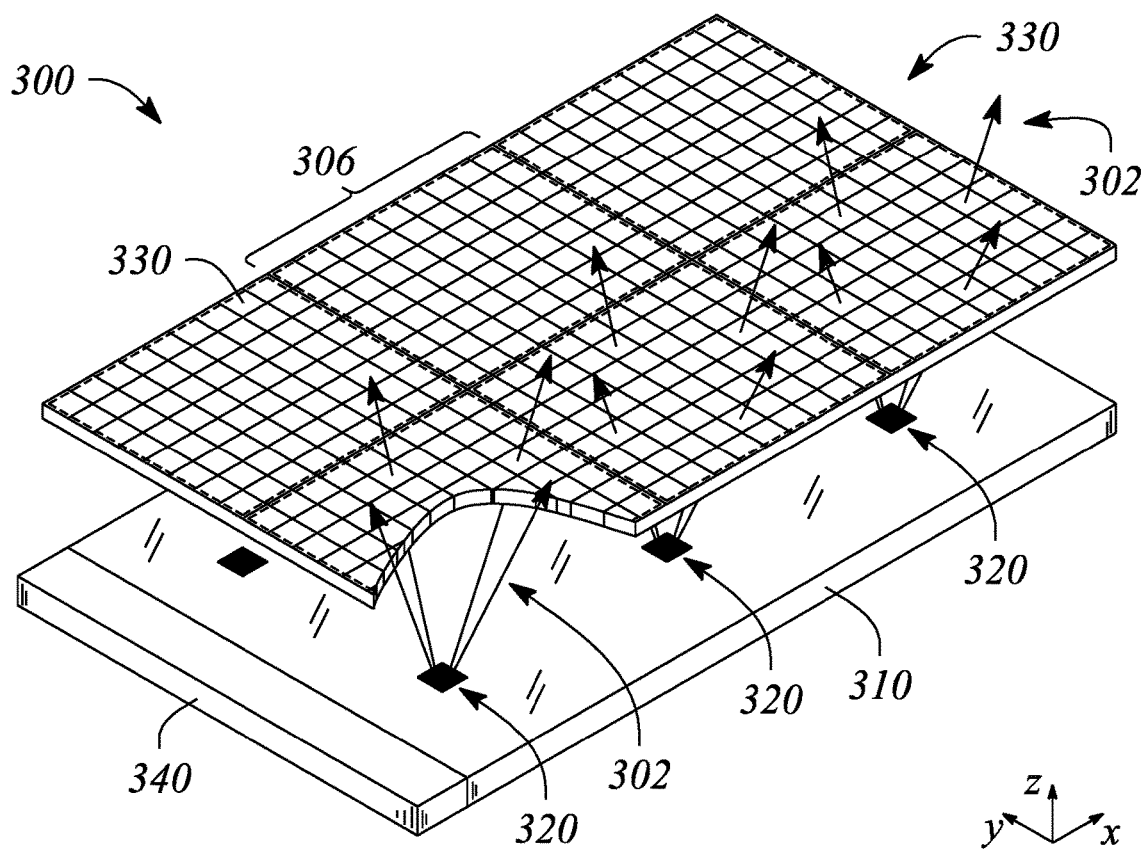
FIG. 4C illustrates a perspective view of a multiview display in an example, according to an embodiment consistent with the principles described herein.

FIG. 4A illustrates a cross-sectional view of a multiview display 300 in an example, according to an embodiment consistent with the principles described herein. FIG. 4B illustrates a plan view of a multiview display 300 in an example, according to an embodiment consistent with the principles described herein. FIG. 4C illustrates a perspective view of a multiview display 300 in an example, according to an embodiment consistent with the principles described herein. The perspective view in FIG. 4C is illustrated with a partial cut-away to facilitate discussion herein only. The multiview display 300 may be employed as the multiview display 220 of the multiview system 200, according to some embodiments.

The multiview display 300 illustrated in FIGS. 4A-4C is configured to provide a plurality of directional light beams 302 having different principal angular directions from one another (e.g., as a light field). In particular, the provided plurality of directional light beams 302 are configured to be scattered out and directed away from the multiview display 300 in different principal angular directions corresponding to respective view directions of the multiview display 300 or equivalently corresponding to directions of different views (e.g., directional views 204) of a multiview image (e.g., multiview image 206) displayed by the multiview display 300, according to various embodiments. According to various embodiments, the directional light beams 302 may be modulated (e.g., using light valves, as described below) to facilitate the display of information having multiview content, i.e., the multiview image 206. FIGS. 4A-4C also illustrate a multiview pixel 306 comprising sub-pixels and an array of light valves 330, which are described in further detail below.

As illustrated in FIGS. 4A-4C, the multiview display 300 comprises a light guide 310. The light guide 310 is configured to guide light along a length of the light guide 310 as guided light 304 (i.e., a guided light beam). For example, the light guide 310 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 304 according to one or more guided modes of the light guide 310, for example.

In some embodiments, the light guide 310 may be a slab or plate optical waveguide (i.e., a plate light guide) comprising an extended, substantially planar sheet of optically transparent, dielectric material. The substantially planar sheet of dielectric material is configured to guide the guided light 304 using total internal reflection. According to various examples, the optically transparent material of the light guide 310 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 310 may further include a cladding layer (not illustrated) on at least a portion of a surface (e.g., one or both of the top surface and the bottom surface) of the light guide 310. The cladding layer may be used to further facilitate total internal reflection, according to some examples.

Further, according to some embodiments, the light guide 310 is configured to guide the guided light 304 according to total internal reflection at a non-zero propagation angle between a first surface 310' (e.g., 'front' surface or side) and a second surface 310" (e.g., 'back' surface or side) of the light guide 310. In particular, the guided light 304 is guided and thus propagates by reflecting or 'bouncing' between the first surface 310' and the second surface 310" of the light guide 310 at the non-zero propagation angle. In some embodiments, a plurality of guided light beams of the guided light 304 comprising different colors of light may be guided by the light guide 310 at respective ones of different color-specific, non-zero propagation angles. Note, the non-zero propagation angle is not illustrated in FIGS. 4A-4C for simplicity of illustration. However, a bold arrow depicting a propagation direction 303 illustrates a general propagation direction of the guided light 304 along the light guide length in FIG. 4A.

As defined herein, a 'non-zero propagation angle' is an angle relative to a surface (e.g., the first surface 310' or the second surface 310") of the light guide 310. Further, the non-zero propagation angle is both greater than zero and less than a critical angle of total internal reflection within the light guide 310, according to various embodiments. For example, the non-zero propagation angle of the guided light 304 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 310.

The guided light 304 in the light guide 310 may be introduced or coupled into the light guide 310 at the non-zero propagation angle (e.g., about 30°-35°). In some examples, a coupling structure such as, but not limited to, a grating, a lens, a mirror or similar reflector (e.g., a tilted collimating reflector), a diffraction grating and a prism (not illustrated) as well as various combinations thereof may facilitate coupling light into an input end of the light guide 310 as the guided light 304 at the non-zero propagation angle. In other examples, light may be introduced directly into the input end of the light guide 310 either without or substantially without the use of a coupling structure (i.e., direct or 'butt' coupling may be employed). Once coupled into the light guide 310, the guided light 304 (e.g., as a guided light beam) is configured to propagate along the light guide 310 in the propagation direction 303 that may be generally away from the input end (e.g., illustrated by bold arrows pointing along an x-axis in FIG. 4A).

Further, the guided light 304, or equivalently the guided light beam, produced by coupling light into the light guide 310 may be a collimated light beam, according to various embodiments. Herein, a 'collimated light' or a 'collimated light beam' is generally defined as a beam of light in which rays of the light beam are substantially parallel to one another within the light beam (e.g., the guided light beam). Also by definition herein, rays of light that diverge or are scattered from the collimated light beam are not considered to be part of the collimated light beam. In some embodiments (not illustrated), the multiview display 300 may include a collimator, such as a grating, a lens, reflector or mirror, as described above, (e.g., tilted collimating reflector) to collimate the light, e.g., from a light source. In some embodiments, the light source itself comprises a collimator. In either case, the collimated light provided to the light guide 310 is a collimated guided light beam. The guided light 304 may be collimated according to or having a collimation factor σ, in various embodiments. Alternatively, the guided light 304 may be uncollimated, in other embodiments.

In some embodiments, the light guide 310 may be configured to 'recycle' the guided light 304. In particular, the guided light 304 that has been guided along the light guide length may be redirected back along that length in another propagation direction 303' that differs from the propagation direction 303. For example, the light guide 310 may include a reflector (not illustrated) at an end of the light guide 310 opposite to an input end adjacent to the light source. The reflector may be configured to reflect the guided light 304 back toward the input end as recycled guided light. In some embodiments, another light source may provide guided light 304 in the other propagation direction 303' instead of or in addition to light recycling (e.g., using a reflector). One or both of recycling the guided light 304 and using another light source to provide guided light 304 having the other propagation direction 303' may increase a brightness of the multiview display 300 (e.g., increase an intensity of the directional light beams 302) by making guided light available more than once, for example, to multibeam elements, described below.

In FIG. 4A, a bold arrow indicating a propagation direction 303' of recycled guided light (e.g., directed in a negative x-direction) illustrates a general propagation direction of the recycled guided light within the light guide 310. Alternatively (e.g., as opposed to recycling guided light), guided light 304 propagating in the other propagation direction 303' may be provided by introducing light into the light guide 310 with the other propagation direction 303' (e.g., in addition to guided light 304 having the propagation direction 303).

As illustrated in FIGS. 4A-4C, the multiview display 300 further comprises a plurality of multibeam elements 320 spaced apart from one another along the light guide length. In particular, the multibeam elements 320 of the plurality are separated from one another by a finite space and represent individual, distinct elements along the light guide length. That is, by definition herein, the multibeam elements 320 of the plurality are spaced apart from one another according to a finite (i.e., non-zero) inter-element distance (e.g., a finite center-to-center distance). Further, the multibeam elements 320 of the plurality generally do not intersect, overlap or otherwise touch one another, according to some embodiments. That is, each multibeam element 320 of the plurality is generally distinct and separated from other ones of the multibeam elements 320.

According to some embodiments, the multibeam elements 320 of the plurality may be arranged in either a 1D array or a 2D array. For example, the multibeam elements 320 may be arranged as a linear 1D array. In another example, the multibeam elements 320 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 320 may be substantially uniform or constant across the array. In other examples, the inter-element distance between the multibeam elements 320 may be varied one or both of across the array and along the length of the light guide 310.

According to various embodiments, a multibeam element 320 of the multibeam element plurality is configured to provide, couple out or scatter out a portion of the guided light 304 as the plurality of directional light beams 302. For example, the guided light portion may be coupled out or scattered out using one or more of diffractive scattering, reflective scattering, and refractive scattering or coupling, according to various embodiments. FIGS. 4A and 4C illustrate the directional light beams 302 as a plurality of diverging arrows depicted as being directed way from the first (or front) surface 310' of the light guide 310. Further, according to various embodiments, a size of the multibeam element 320 is comparable to a size of a sub-pixel (or equivalently a light valve 330) of a multiview pixel 306, as defined above and further described below and illustrated in FIGS. 4A-4C. Herein, the 'size' may be defined in any of a variety of manners to include, but not be limited to, a length, a width or an area. For example, the size of a sub-pixel or a light valve 330 may be a length thereof and the comparable size of the multibeam element 320 may also be a length of the multibeam element 320. In another example, the size may refer to an area such that an area of the multibeam element 320 may be comparable to an area of the sub-pixel (or equivalently the light value 330).

In some embodiments, the size of the multibeam element 320 is comparable to the sub-pixel size such that the multibeam element size is between about fifty percent (50%) and about two hundred percent (200%) of the sub-pixel size. For example, if the multibeam element size is denoted 's' and the sub-pixel size is denoted 'S' (e.g., as illustrated in FIG. 4A), then the multibeam element size s may be given by $$\tfrac{1}{2}S \le s \le 2S$$

In other examples, the multibeam element size is in a range that is greater than about sixty percent (60%) of the sub-pixel size, or greater than about seventy percent (70%) of the sub-pixel size, or greater than about eighty percent (80%) of the sub-pixel size, or greater than about ninety percent (90%) of the sub-pixel size, and that is less than about one hundred eighty percent (180%) of the sub-pixel size, or less than about one hundred sixty percent (160%) of the sub-pixel size, or less than about one hundred forty (140%) of the sub-pixel size, or less than about one hundred twenty percent (120%) of the sub-pixel size. For example, by 'comparable size', the multibeam element size may be between about seventy-five percent (75%) and about one hundred fifty (150%) of the sub-pixel size. In another example, the multibeam element 320 may be comparable in size to the sub-pixel where the multibeam element size is between about one hundred twenty-five percent (125%) and about eighty-five percent (85%) of the sub-pixel size. According to some embodiments, the comparable sizes of the multibeam element 320 and the sub-pixel may be chosen to reduce, or in some examples to minimize, dark zones between views of the multiview display. Moreover, the comparable sizes of the multibeam element 320 and the sub-pixel may be chosen to reduce, and in some examples to minimize, an overlap between views (or view pixels) of the multiview display.

The multiview display 300 illustrated in FIGS. 4A-4C further comprises the array of light valves 330 configured to modulate the directional light beams 302 of the directional light beam plurality. In various embodiments, different types of light valves may be employed as the light valves 330 of the light valve array including, but not limited to, one or more of liquid crystal light valves, electrophoretic light valves, and light valves based on electrowetting.

As illustrated in FIGS. 4A-4C, different ones of the directional light beams 302 having different principal angular directions pass through and may be modulated by different ones of the light valves 330 in the light valve array. Further, as illustrated, a light valve 330 of the array corresponds to a sub-pixel of the multiview pixel 306, and a set of the light valves 330 corresponds to a multiview pixel 306 of the multiview display. In particular, a different set of light valves 330 of the light valve array is configured to receive and modulate the directional light beams 302 from a corresponding one of the multibeam elements 320, i.e., there is one unique set of light valves 330 for each multibeam element 320, as illustrated.

As illustrated in FIG. 4A, a first light valve set 330a is configured to receive and modulate the directional light beams 302 from a first multibeam element 320a. Further, a second light valve set 330b is configured to receive and modulate the directional light beams 302 from a second multibeam element 320b. Thus, each of the light valve sets (e.g., the first and second light valve sets 330a, 330b) in the light valve array corresponds, respectively, both to a different multibeam element 320 (e.g., elements 320a, 320b) and to a different multiview pixel 306, with individual light valves 330 of the light valve sets corresponding to the sub-pixels of the respective multiview pixels 306, as illustrated in FIG. 4A.

Note that, as illustrated in FIG. 4A, the size of a sub-pixel of a multiview pixel 306 may correspond to a size of a light valve 330 in the light valve array. In other examples, the sub-pixel size may be defined as a distance (e.g., a center-to-center distance) between adjacent light valves 330 of the light valve array. For example, the light valves 330 may be smaller than the center-to-center distance between the light valves 330 in the light valve array. The sub-pixel size may be defined as either the size of the light valve 330 or a size corresponding to the center-to-center distance between the light valves 330, for example.

In some embodiments, a relationship between the multibeam elements 320 and corresponding multiview pixels 306 (i.e., sets of sub-pixels and corresponding sets of light valves 330) may be a one-to-one relationship. That is, there may be an equal number of multiview pixels 306 and multibeam elements 320. FIG. 4B explicitly illustrates by way of example the one-to-one relationship where each multiview pixel 306 comprising a different set of light valves 330 (and corresponding sub-pixels) is illustrated as surrounded by a dashed line. In other embodiments (not illustrated), the number of multiview pixels 306 and the number of multibeam elements 320 may differ from one another.

In some embodiments, an inter-element distance (e.g., center-to-center distance) between a pair of multibeam elements 320 of the plurality may be equal to an inter-pixel distance (e.g., a center-to-center distance) between a corresponding pair of multiview pixels 306, e.g., represented by light valve sets. For example, as illustrated in FIG. 4A, a center-to-center distance d between the first multibeam element 320a and the second multibeam element 320b is substantially equal to a center-to-center distance D between the first light valve set 330a and the second light valve set 330b. In other embodiments (not illustrated), the relative center-to-center distances of pairs of multibeam elements 320 and corresponding light valve sets may differ, e.g., the multibeam elements 320 may have an inter-element spacing (i.e., center-to-center distance d) that is one of greater than or less than a spacing (i.e., center-to-center distance D) between light valve sets representing multiview pixels 306.

In some embodiments, a shape of the multibeam element 320 is analogous to a shape of the multiview pixel 306 or equivalently, to a shape of a set (or 'sub-array') of the light valves 330 corresponding to the multiview pixel 306. For example, the multibeam element 320 may have a square shape and the multiview pixel 306 (or an arrangement of a corresponding set of light valves 330) may be substantially square. In another example, the multibeam element 320 may have a rectangular shape, i.e., may have a length or longitudinal dimension that is greater than a width or transverse dimension. In this example, the multiview pixel 306 (or equivalently the arrangement of the set of light valves 330) corresponding to the multibeam element 320 may have an analogous rectangular shape. FIG. 4B illustrates a top or plan view of square-shaped multibeam elements 320 and corresponding square-shaped multiview pixels 306 comprising square sets of light valves 330. In yet other examples (not illustrated), the multibeam elements 320 and the corresponding multiview pixels 306 have various shapes including or at least approximated by, but not limited to, a triangular shape, a hexagonal shape, and a circular shape.

Further (e.g., as illustrated in FIG. 4A), each multibeam element 320 is configured to provide directional light beams 302 to one and only one multiview pixel 306 at a given time based on the set of sub-pixels that are assigned to a particular multiview pixel 306, according to some embodiments. In particular, for a given one of the multibeam elements 320 and an assignment of the set of sub-pixels to a particular multiview pixel 306, the directional light beams 302 having different principal angular directions corresponding to the different views of the multiview display are substantially confined to the single corresponding multiview pixel 306 and the sub-pixels thereof, i.e., a single set of light valves 330 corresponding to the multibeam element 320, as illustrated in FIG. 4A. As such, each multibeam element 320 of the multiview display 300 provides a corresponding set of directional light beams 302 that has a set of the different principal angular directions corresponding to the different views of the multiview display (i.e., the set of directional light beams 302 contains a light beam having a direction corresponding to each of the different view directions).

The multiview display 300 may further comprise a light source 340. According to various embodiments, the light source 340 is configured to provide the light to be guided within light guide 310. In particular, the light source 340 may be located adjacent to an entrance surface or end (input end) of the light guide 310. In various embodiments, the light source 340 may comprise substantially any source of light (e.g., optical emitter) including, but not limited to, an LED, a laser (e.g., laser diode) or a combination thereof. In some embodiments, the light source 340 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 340 may be a substantially broadband light source configured to provide substantially broadband or polychromatic light. For example, the light source 340 may provide white light. In some embodiments, the light source 340 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 340 may further comprise a collimator. The collimator may be configured to receive substantially uncollimated light from one or more of the optical emitters of the light source 340. The collimator is further configured to convert the substantially uncollimated light into collimated light. In particular, the collimator may provide collimated light having the non-zero propagation angle and being collimated according to a predetermined collimation factor σ, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 310 to propagate as the guided light 304, described above.

In some embodiments, the multiview display 300 is configured to be substantially transparent to light in a direction through the light guide 310 orthogonal to (or substantially orthogonal) to a propagation direction 303, 303' of the guided light 304. In particular, the light guide 310 and the spaced apart multibeam elements 320 allow light to pass through the light guide 310 through both the first surface 310' and the second surface 310", in some embodiments. Transparency may be facilitated, at least in part, due to both the relatively small size of the multibeam elements 320 and the relative large inter-element spacing (e.g., one-to-one correspondence with the multiview pixels 306) of the multibeam element 320. Further, the multibeam elements 320 may also be substantially transparent to light propagating orthogonal to the light guide surfaces 310', 310", according to some embodiments.

According to various embodiments, a wide variety of optical components may be used to generate the directional light beams 302, including, diffraction gratings, micro-reflective elements and/or micro-refractive elements optically connected to the light guide 310 to scatter out the guided light 304 as the directional light beams 302. Note that these optical components may be located at the first surface 310', the second surface 310", or even between the first and second surfaces 310', 310" of the light guide 310. Furthermore, an optical component may be a 'positive feature' that protrudes out from either the first surface 310' or the second surface 310", or it may be a 'negative feature' that is recessed into either the first surface 310' or the second surface 310", according to some embodiments.

In some embodiments, light guide 310, the multibeam elements 320, the light source 340 and/or an optional collimator serve as a multiview backlight. This multiview backlight may be used in conjunction with the light valve array in the multiview display 300, e.g., as the multiview display 220. For example, the multiview backlight may serve as a source of light (often as a panel backlight) for the array of light valves 330, which modulate the directional light beams 302 provided by the multiview backlight to provide the directional views 204 of the multiview image 206, as described above.

In some embodiments, the multiview display 300 may further comprise a broad-angle backlight. In particular, the multiview display 300 (or multiview display 220 of the multiview system 200) may include a broad-angle backlight in addition to the multiview backlight, described above. The broad-angle backlight may be adjacent to the multiview backlight, for example.

Figure 5:
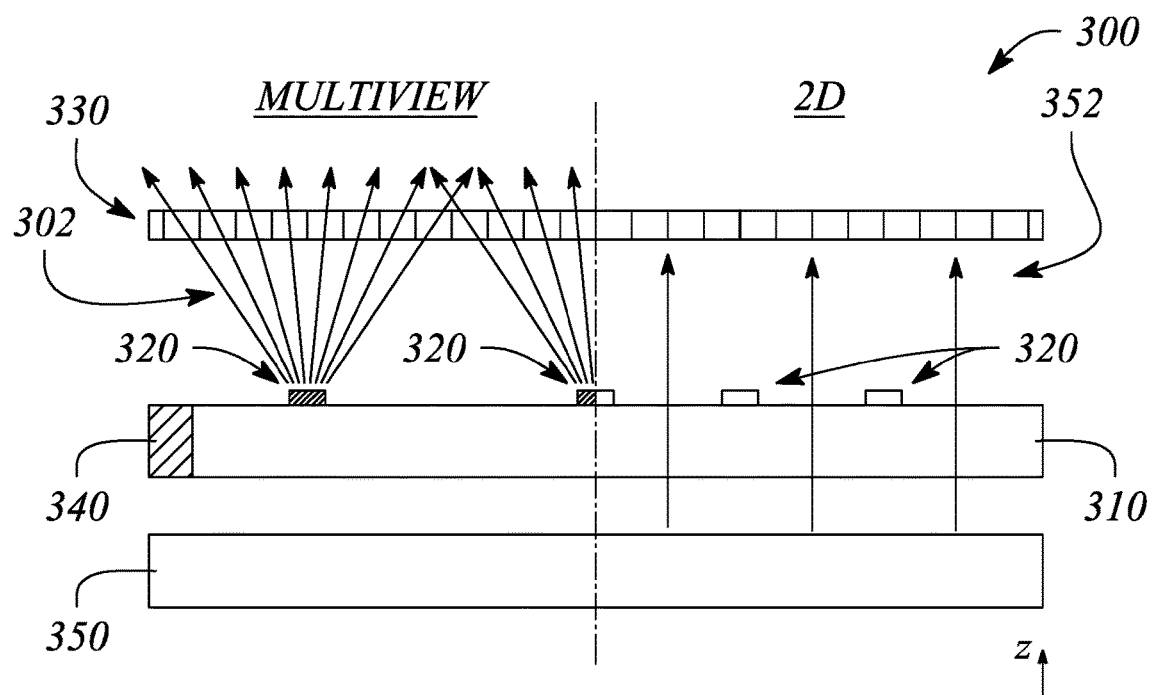
FIG. 5 illustrates a cross-sectional view of a multiview display including a broad-angle backlight in an example, according to an embodiment consistent with the principles described herein.

FIG. 5 illustrates a cross-sectional view of a multiview display 300 including a broad-angle backlight 350 in an example, according to an embodiment consistent with the principles described herein. As illustrated, the broad-angle backlight 350 is configured to provide broad-angle emitted light 352 during a first mode. The multiview backlight (e.g., the light guide 310, multibeam elements 320, and light source 340) may be configured to provide the directional emitted light as the directional light beams 302 during a second mode, according to various embodiments. Further, the array of light valves is configured to modulate the broad-angle emitted light 352 to provide a two-dimensional (2D) image during the first mode and to modulate the directional emitted light (or directional light beams 302) to provide the multiview image during the second mode. For example, when the multiview display 300 illustrated in FIG. 5 is employed as the multiview display 220 of the multiview system 200, the 2D image may be captured by a camera or cameras of the multiview camera array 210. As such, the 2D image may simply represent one of the directional views 204 of the scene 202 during the second mode, according to some embodiments.

As illustrated on a left side of FIG. 5, the multiview image (MULTIVIEW) may be provided using the multiview backlight by activating the light source 340 to provide directional light beams 302 scattered from the light guide 310 using the multibeam elements 320. Alternatively, as illustrated on a right side of FIG. 5, the 2D image may be provided by inactivating the light source 340 and activating the broad-angle backlight 350 to provide broad-angle emitted light 352 to the array of light valves 330. As such, the multiview display 300 including the broad-angle backlight 350 may be switched between displaying the multiview image and displaying the 2D image, according to various embodiments.

Figure 6:
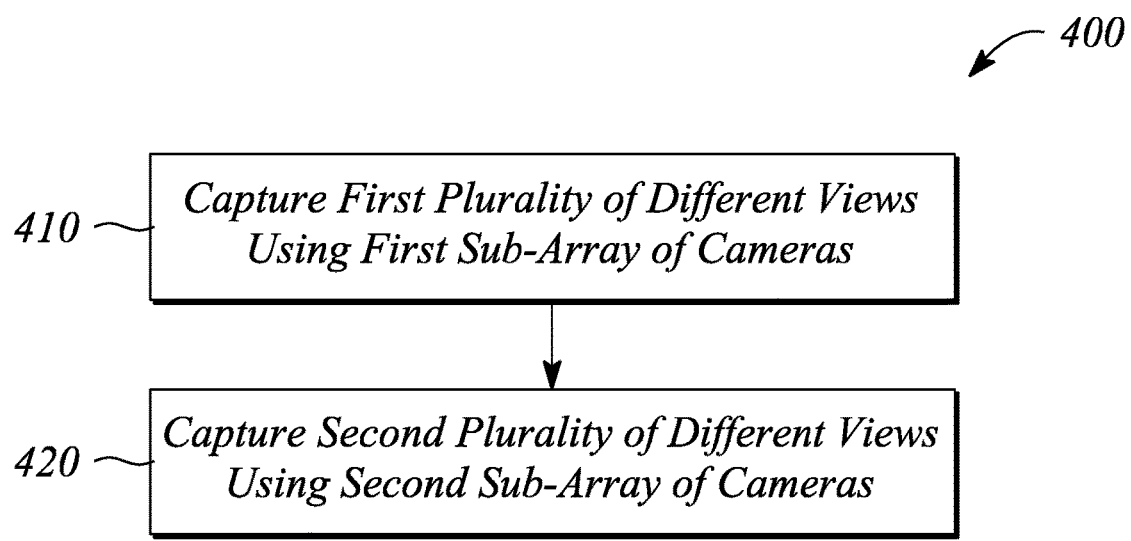
FIG. 6 illustrates a flow chart of a method of capturing a multiview image in an example, according to an embodiment consistent with the principles described herein.

In accordance with other embodiments of the principles described herein, a method of capturing a multiview image is provided. FIG. 6 illustrates a flow chart of a method 400 of capturing a multiview image in an example, according to an embodiment consistent with the principles described herein. As illustrated in FIG. 6, the method 400 of capturing a multiview image comprises capturing 410 a first plurality of different views of a scene using a first sub-array of cameras spaced apart from one another by a first baseline distance. In some embodiments, the first sub-array of cameras may be substantially similar to the first sub-array of cameras 110 in the multiview camera array 100. Likewise, the scene may be substantially similar to the scene 102, according to some embodiments.

The method 400 of capturing a multiview image illustrated in FIG. 6 further comprises capturing 420 a second plurality of different views of a scene using a second sub-array of cameras spaced apart from one another by a second baseline distance. According to various embodiments, the first baseline distance is an integer multiple of the second baseline distance. Further, at least one camera of the second sub-array of cameras is a member of the first sub-array of cameras, in various embodiments. In some embodiments, the second sub-array of cameras may be substantially similar to the second sub-array of cameras 120 in the multiview camera array 100, described above. In particular, the multiview image comprises the plurality of different views of the scene captured using a selected one of the first and second sub-arrays of cameras, according to various embodiments.

In some embodiments, a number of cameras in the first sub-array is equal to a number of cameras in the second sub-array of cameras. In some embodiments, a number of the different views of the multiview image may correspond to the number of cameras. In some embodiments, a user input may determine the selected one of the first and second sub-arrays of cameras. Alternatively, an auto-focus of a camera of the multiview camera array may automatically determine the selected one of the first and second camera sub-arrays based on a focal plane of the scene, in some embodiments.

Thus, there have been described examples and embodiments of a multiview camera array, a method of capturing a multiview image, and a multiview system that includes a multiview camera array and a multiview display in which sub-arrays of cameras include at least one camera in common. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview camera array comprising: a first sub-array of cameras spaced apart from one another by a first baseline distance; and a second sub-array of cameras spaced apart from one another by a second baseline distance, the first baseline distance being an integer multiple of the second baseline distance and at least one camera of the second sub-array of cameras being a member of the first sub-array of cameras, wherein: cameras of the first camera sub-array are configured to capture a first plurality of images of a scene representing different views of a multiview image of the scene; cameras of the second camera sub-array are configured to capture a second plurality of images of the scene representing different views of a multiview image of the scene; and the multiview camera array 1s configured to select between the first and second pluralities of images based on a distance between the multiview camera array and an object in the scene.

2. The multiview camera array of claim 1, wherein a number of the cameras in the first sub-array of cameras is equal to a number of the cameras in the second sub-array of cameras, a number of the different views of the multiview image corresponding to the number of the cameras.

3. The multiview camera array of claim 1, wherein each of the first sub-array of cameras and the second sub-array of cameras is a linear array, cameras of the second sub-array of cameras being interleaved with cameras of the first sub-array of cameras along a common linear axis.

4. The multiview camera array of claim 1, wherein a camera of the multiview camera array includes an auto-focus that is configured to automatically determine the camera distance between the multiview camera array and the object in the scene.

5. A multiview system comprising: a multiview camera array having a plurality of camera sub-arrays configured to capture a multiview image of a scene, camera sub-arrays of the camera sub-array plurality being interleaved with one another and at least two of the camera sub-arrays having a camera in common; and a multiview display configured to display the multiview image, a number of different views of the multiview image corresponding to a number of cameras in the camera sub-arrays of the multiview camera array, wherein: baseline distances between adjacent cameras within different ones of the camera sub-arrays are integer multiples of one another;
 cameras of each camera subarray are configured to capture a plurality of images of the scene representing different views of a multiview image of the scene;
 and the multiview camera array is configured to select among the pluralities of images based on a distance between the multiview camera array and an object in the scene.

6. The multiview system of claim 5, wherein cameras of the plurality of camera sub-arrays are arranged along a common linear axis, the multiview camera array being a linear array.

7. The multiview system of claim 5, wherein the different views of multiview image correspond to images captured by different cameras of a selected camera sub-array of the plurality of camera.

8. The multiview system of claim 7, wherein the distance between the multiview camera array and the object in the scene is determined by an auto-focus condition of a camera of the multiview camera array.

9. The multiview system of claim 5, wherein each camera sub-array of the camera sub-array plurality has an equivalent number of cameras.

10. The multiview system of claim 5, wherein the multiview display comprises: a multiview backlight comprising a light guide; an array of multibeam elements spaced apart from one another and configured to scatter out guided light from the light guide as directional emitted light having directions corresponding to view directions of the multiview image; and a light valve array configured to modulate the directional emitted light to provide the multiview image, wherein a multibeam element of the array of multibeam elements has a size comparable to a size of a light valve of the light valve array and a shape analogous to a shape of a multiview pixel associated with the multibeam element.

11. The multiview system of claim 10, wherein the directional emitted light provided by an individual multibeam element of the array of multibeam elements comprises a plurality of directional light beams having different principal angular directions corresponding to view directions of the multiview image.

12. The multiview system of claim 10, wherein the multibeam element of the array of multibeam elements comprises one or more of a diffraction grating, a micro-reflective element and a micro-refractive element optically connected to the light guide to scatter out the guided light as the directional emitted light.

13. The multiview system of claim 10, further comprising a light source optically coupled to an input of the light guide of the multiview backlight, the light source being configured to provide the guided light one or both of having a non-zero propagation angle and being collimated according to a predetermined collimation factor.

14. The multiview system of claim 10, further comprising a broad-angle backlight configured to provide broad-angle emitted light during a first mode, the multiview backlight being configured to provide the directional emitted light during a second mode, wherein the light valve array is configured to modulate the broad-angle emitted light to provide a two-dimensional image during the first mode and to modulate the directional emitted light to provide the multiview image during the second mode.

15. A method of capturing a multiview image, the method comprising: capturing a first plurality of different views of a scene using a first sub-array of cameras spaced apart from one another by a first baseline distance; capturing a second plurality of different views of a scene using a second sub-array of cameras spaced apart from one another by a second baseline distance, the first baseline distance being an integer multiple of the second baseline distance and at least one camera of the second sub-array of cameras being a member of the first sub-array of cameras; selecting between the first and second pluralities of different views based on a distance between the first sub-array of cameras and an object in the scene; and forming the multiview image from the selected first or second plurality of different views.

16. The method of capturing a multiview image of claim 15, wherein a number of cameras in the first sub-array is equal to a number of cameras in the second sub-array of cameras, a number of the different views of the multiview image corresponding to the number of cameras.

17. The method of capturing a multiview image of claim 15, wherein an auto-focus of a camera of the multiview camera array automatically determines the distance between the first sub-array of cameras and the object in the scene.

* * * * *